Aug. 3, 1965

C. E. QUINN 3,198,279

PASSIVE GUIDANCE SYSTEM

Filed July 9, 1962

INVENTOR.
Clark E. Quinn
BY
Paul J. Ethington
ATTORNEY

INVENTOR.
Clark E. Quinn
BY
Paul J. Ethington
ATTORNEY

United States Patent Office 3,198,279
Patented Aug. 3, 1965

3,198,279
PASSIVE GUIDANCE SYSTEM
Clark E. Quinn, Rochester, Mich., assignor to General Motors Corporation, Detroit, Mich., a corporation of Delaware
Filed July 9, 1962, Ser. No. 208,368
10 Claims. (Cl. 180—79)

This invention relates to a system for automatically guiding a dirigible vehicle along a predetermined path.

There are presently known many systems for automatically guiding a vehicle along a predetermined path of travel, including both active and passive roadway installations. The active roadway installations generally take the form of a current carrying cable which radiates an electromagnetic field in the audio frequency range. These systems have the disadvantage that power applied to the cable must be sufficient to extend along a great portion of the roadway, such that a minimum number of power oscillators is required. Additionally, if these systems are continually actuated, power is wasted during the times when the roadway is not occupied. In order to overcome this objection, systems have been proposed which provide means to turn on the power oscillator in response to a trigger signal provided by the presence of a vehicle. However, these systems obviously involve a great number of active elements. The reliability of the system will inherently be decreased with an increase in the number of active elements. Thus, it is preferable to provide a system with as few active elements as possible.

Passive roadway installations have been proposed employing radiation or light reflecting means to define the desired path of vehicle travel. Other proposals suggest the use of radioactive material to define the desired path. However, these systems suffer from such disadvantages as poor reliability in times of bad weather or roadway surface conditions, and, also, from the requirement for a large number of intricate and expensive elements to sense the roadway signal.

The present invention proposes a simple and reliable system of automatic vehicle guidance, which may be readily incorporated with existing highway designs. The means for defining the desired path of vehicle travel is entirely passive and, hence, requires no power source which must be permanently supervised by the roadway authority. Accordingly, the present system provides vehicle mounted actuating and receiving means, such that no power is expended during periods when the roadway is not in use. The actuating means on each vehicle are required to produce only sufficient power to actuate the system in the immediate vicinity of the vehicle. A further advantage is that the roadway element may be employed to define a plurality of desired paths of vehicle travel on a multi-directional roadway; thus, obtaining maximum utility from a minimum of material.

In brief, the present invention accomplishes these objectives by disposing closed loops of conductive material end-to-end in a continuous fashion along the roadway, such that a portion of each loop defines the desired path of vehicle travel. A signal transmitter is mounted on each vehicle to inductively couple the signal into the loop disposed in immediate proximity to the vehicle. This signal establishes an electromagnetic field about the loop which extends above the roadway along that portion of the loop which defines the desired path of vehicle travel. A pickup is mounted on each vehicle in such a manner as to be responsive to the electromagnetic field to generate a guidance signal. This guidance signal is indicative of the deviation of the vehicle from the desired path. A suitable servo means is connected to receive the guidance signal and to act through a mechanical connection to the vehicle steering system to maintain the vehicle on the desired path.

The present invention also provides means to prevent interference between signals from two or more vehicles proceeding either in the same or opposite directions. This is accomplished by establishing transmitted frequency standards for respective directions of travel, and providing frequency selective means associated with the vehicle-mounted pickups to accept only those frequencies being transmitted by vehicles proceeding in one direction. Additionally, each of the closed roadway loops may be of such a length as to permit occupation by only a single vehicle under normal highway conditions.

The system also incorporates means to prevent an air coupling between the transmitter and receiver of a single vehicle. This means renders the pickup sensitive only to the electromagnetic field radiated by the closed loop.

These and other advantages of the present invention will become more apparent upon reading of the following specification which is to be taken with the accompanying drawings of which:

Figure 1:
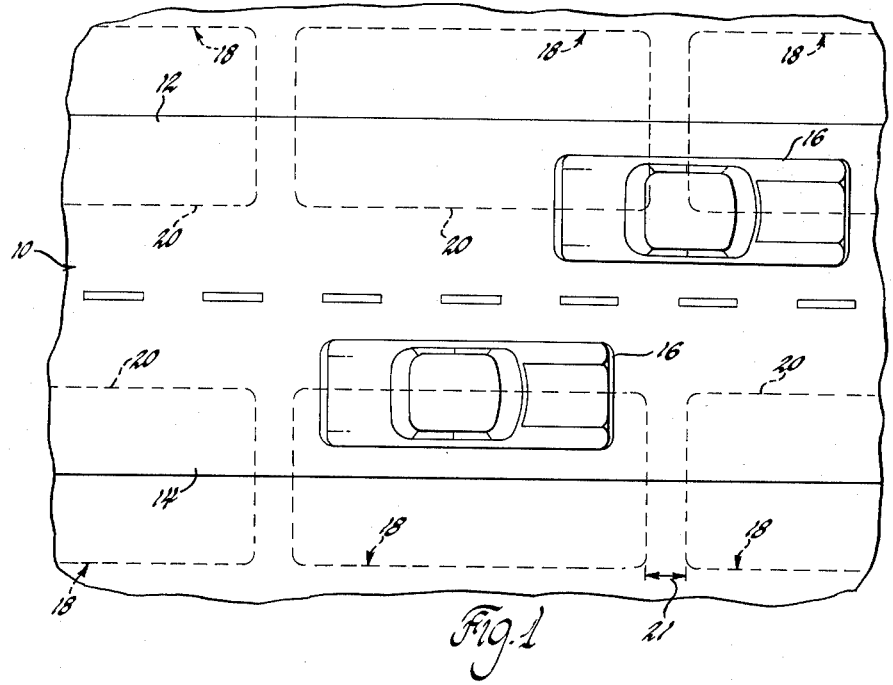
FIGURE 1 is a plan view of a portion of a two-lane, unidirectional roadway properly equipped for operation as specified by one form of the present invention.

FIGURE 1 is illustrative of the present invention as applied to a roadway 10 having two adjacent lanes 12 and 14, on which vehicles 16 travel in the same direction. In this figure, a plurality of rectangular closed loops 18 of conductive material are laid end-to-end along each of the lanes 12 and 14 a shallow depth beneath the roadway surface. The loops 18, which are somewhat longer than the vehicle 16, are disposed such that the interior longitudinal portions 20 thereof define two substantially continuous paths of vehicle travel along the centers of the lanes 12 and 14. The adjacent loops 18 are disposed with a longitudinal spacing 21 therebetween which is small compared to the overall loop length, such that the pickup system disclosed in FIGURE 2 will not be sensitive to the discontinuity between the loops 18. The exterior longitudinal portions of the loops 18 lie off the roadway surface and under the shoulder of the road a distance of a few feet as shown. Each of the vehicles 16 is equipped with means to be automatically guided along the continuous paths of vehicle travel defined by the interior portions 20 of the loops 18.

Figure 2:
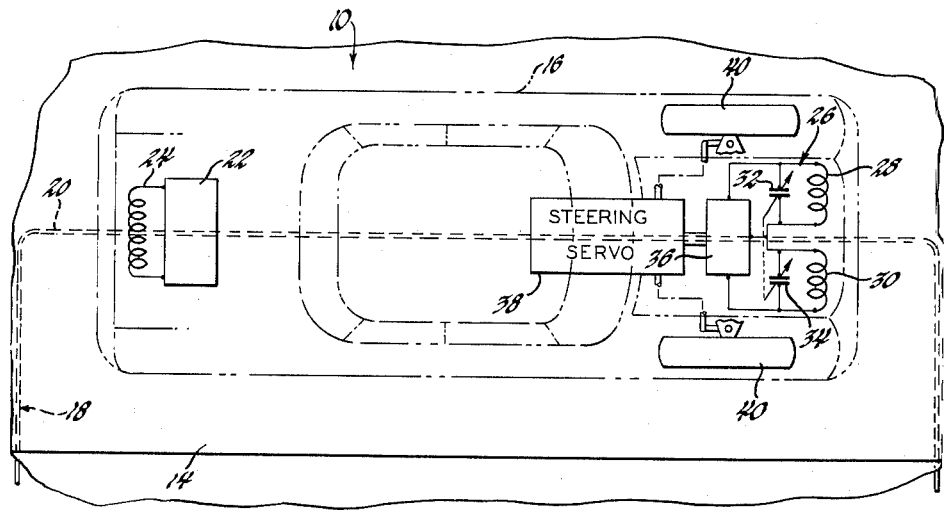
FIGURE 2 is a plan view of a portion of roadway showing the normal disposition of a vehicle equipped with automatic guidance apparatus compatible with the present invention.

Referring now to FIGURE 2, the vehicle 16 is shown in a normal position in the roadway lane 14. This figure indicates the general nature of the auto-mounted equipment consistent with the inventive guidance system. As previously described with reference to FIGURE 1, the desired path of vehicle travel is defined by a closed loop 18 of conductive material, disposed in the roadway such that a longitudinal portion 20 of the loop extends along the center of the lane 14 for a distance slightly exceeding one car length. Suitably mounted on the rear of the vehicle 16 is a transmitter 22 capable of producing a low-power audio frequency signal. The transmitter 22 is inductively coupled with the closed loop 18 by an inductive coil 24. By means of the inductive coil 24, the transmitter 22 is capable of inducing a signal in the closed loop 18, which causes the loop to radiate an electromagnetic field above the surface of the roadway lane 14. This electromagnetic field extending longitudinally along the lane 14 as defined by the portion 20 of the loop 18 to provide the desired path of vehicle travel. Mounted on the front of the vehicle 16 is a suitable pickup arrangement, generally designated by reference character 26. The pickup arrangement 26 is responsive to the electromagnetic field to produce a guidance signal indicative of the disposition of the vehicle 16 with respect to the desired path of vehicle travel.

The pickup arrangement 26 may be of the same type as that disclosed in United States Patent No. 2,990,902, which issued July 4, 1961, in the name of Roy S. Cataldo and which is assigned to the assignee of the present invention. As disclosed in that patent, the pickup arrangement 26 comprises a pair of inductive coils 28 and 30, which are normally positioned in the electromagnetic field on opposite sides of the loop and are each wound so as to have an alternating voltage signal induced therein as a result of passing through the electromagnetic field radiated from the interior portion 20 of loop 18. It should be noted that the amplitude of this voltage signal will be a function of the respective distances between the coils 28 and 30 and the portion 20 of the closed loop 18. The sensitivity of each of the coils 28 and 30 may be increased by means of mutually adjustable capacitors 32 and 34, which are respectively connected in shunt with the inductive coils. The parallel combination of the inductive coil and capacitor on each side of the pickup arrangement 26 forms a resonant tank circuit which is tuned to the frequency of the electromagnetic field emanating from the closed loop 18. It should be noted that the portion of loop 18 which lies under the shoulder of the road is far enough from the interior portion 20 that the signal coupling from this outside portion to the pickup arrangement 26 is negligible.

As further disclosed in the above cited patent, each of the coils 28 and 30 of the pickup arrangement 26 has induced therein a voltage which is related to the distance from the coil to the center of the roadway lane 14. When the vehicle 16 is properly disposed such that the coils 28 and 30 are at equal distances from the portion 20 of the loop 18, the voltages induced in the respective coils will be equal. Thus, when the voltages are applied in opposition to a suitable comparison means, they will cancel.

The coils 28 and 30 of the pickup arrangement 26 are connected in opposition to a differential amplifier 36. The amplifier 36 serves to compare the alternating voltages induced in the coils 28 and 30 and to produce a guidance signal when an unbalance exists between the coil voltages as a result of an improper disposition of the vehicle 16. The output of the amplifier 36 is electrically connected to a steering servo 38 which is mechanically connected to the dirigible wheels 40 of the vehicle 16. The steering servo 38 is responsive to the magnitude and polarity of the guidance signal to turn the wheels 40 in a direction tending to align the vehicle 16 properly with the roadway lane 14. A suitable steering servo is also disclosed in the above cited patent to Cataldo 2,990,902.

It is to be understood that the pickup arrangement 26 and the associated steering servo 38 may assume a number of different forms as are defined by the prior art. The requirement placed by the present invention on the particular pickup arrangement to be employed is that suitable frequency selective means are provided to render the pickup insensitive to electromagnetic fields having a frequency substantially different from that of the signal transmitted by the transmitter 22.

In the system of FIGURE 2, the transmitter 22 is mounted adjacent the rear of the vehicle 17 while the pickup arrangement 26 is mounted adjacent the front thereof. Since the transmitter 22 is normally required to generate only a low-power signal, i.e. one watt, under ordinary conditions there will be no direct air coupling between the inductive coil 24 and the pickup coils 28 and 30. Thus, the pickup arrangement 26 will be sensitive only to the electromagnetic field radiated by the closed loop 18. Similarly, the interior portion 20 of the closed loop 18 is sufficiently separated from the remainder thereof such that no interference is produced from the opposite longitudinal portion of the loop 18. However, in the event that a higher power signal is required from the transmitter 22, or it is necessary to mount the transmitter in close proximity to the pickup arrangement 26, a swamping of the loop-radiated guidance field by the direct air coupling to the transmitter 22 can be avoided by means of the apparatus shown in FIGURE 3.

Figure 3:
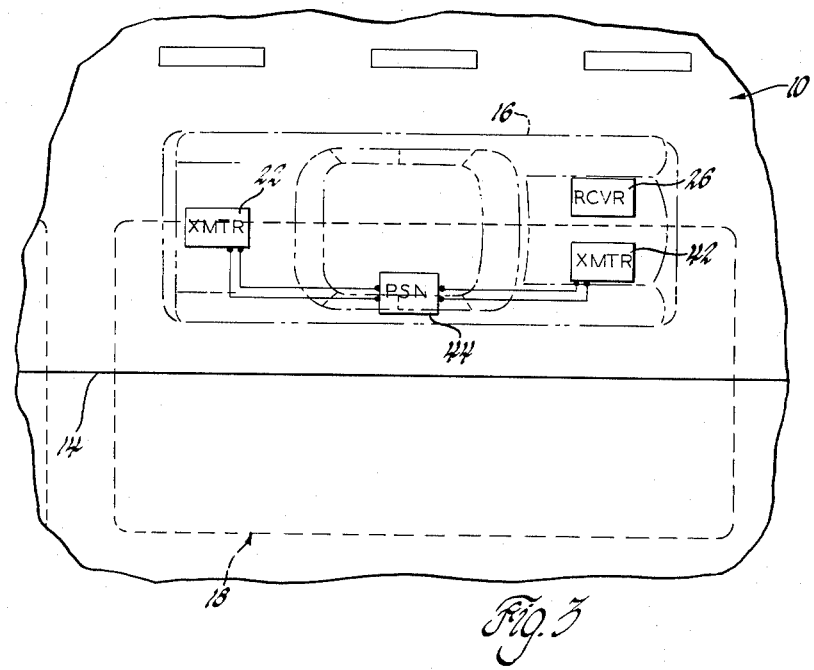
FIGURE 3 is a plan view of a portion of roadway showing a vehicle equipped with one form of apparatus effective to prevent the aforementioned air coupling between receiver and transmitter.

In the system of FIGURE 3, the vehicle 16 is shown having a transmitter 22 mounted on the rear thereof and a receiver or pickup arrangement 26 mounted on the front. An additional transmitter 42 is also provided on the front of the vehicle 16 in proximity to the pickup arrangement 26. The transmitter 42 is connected to the transmitter 22 by means of a phase shift network 44. In this system, a portion of the transmitted signal from the transmitter 22 is shifted 180° in phase from the signal radiated to the closed loop 18 and applied to the transmitter 42. The transmitter 42 then directly couples a signal into the pickup arrangement 26 which cancels the signal directly coupled to the pickup arrangement 26 from the transmitter 22. In this manner, the pickup arrangement 26 is rendered insensitive to the air-coupled signal from transmitter 22 and will be responsive only to the electromagnetic field radiated by the loop 18.

In operation, a system such as shown in FIGURE 3 would be manually adjusted to a null while the vehicle 16 is displaced away from the closed loop 18. The strength of the signal radiated by transmitter 42 may be adjusted to obtain a null condition in the voltage generated by the pickup arrangement 26. Then when the vehicle is proceeding along the roadway, the pickup arrangement 26 will have an additional signal induced therein which is responsive to the electromagnetic field provided by the guidance portion 20 of loop 18.

Alternatively, the system of FIGURE 3 may be replaced with an electrical system whereby a direct electrical connection is made between the transmitter 22 and the pickup arrangement 26. Again such a connection is made for the purpose of nulling out the airborne signal from the transmitter 22 which is received by the pickup arrangement 26. The nulling signal then acts as a bias on the pickup arrangement 26 which is overcome by passage through the loop-radiated electromagnetic field. Such a nulling device may take one of several forms as will be apparent to one skilled in the art.

As previously stated, the pickup arrangement 26 of FIGURE 2 must be capable of traversing the space between the loops 18 without a loss of steering control. This may readily be accomplished by a capacitive circuit associated with each of the pickup coils 28 and 30 and having a discharge path with a time constant considerably longer than the time required to traverse the space between loops. It can be seen that with the pickup arrangement 26 mounted on the front of the vehicle 16 and the transmitter 22 mounted on the rear, the discharge time will necessarily be long enough to allow the entire vehicle to move into a position over the portion 20 of the loop 18 before the steering signal has diminished significantly. Although it is not claimed as part of this invention, it can be seen that known methods of speed control, operating on the rate of interception of the spaces between the loops 18, could be incorporated with this system.

The loops 18 have been defined as having a length which allows the occupation of a single loop by only a single vehicle at one time. This is to avoid a cancellation effect in the electromagnetic field due to the presence of two vehicles in proximity to a single loop 14. For directional identification purposes, it is preferable that vehicles proceeding in one direction will all operate their transmitters on a single frequency. The need for such standardization will become more apparent upon examination of the system of FIGURE 4. It would not be practicable to synchronize all of the transmitters on the various vehicles such that they are all transmitting in phase. Thus, it is possible that two vehicles proceeding in the same direction may radiate equal frequency signals which are 180° out of phase. In the event that these two vehicles occupy a single loop 18, the signal induced in the loop would be effectively cancelled and no steering signal would be provided for either vehicle. Thus, the loops 18 are shortened to the extent that no cancellation is possible under normal highway conditions. It will be understood that as higher average speeds are contemplated, the length of the loops 18 may be made greater. The average loop length will thus be a function of such variables as expected vehicle speed and vehicle length.

Figure 4:
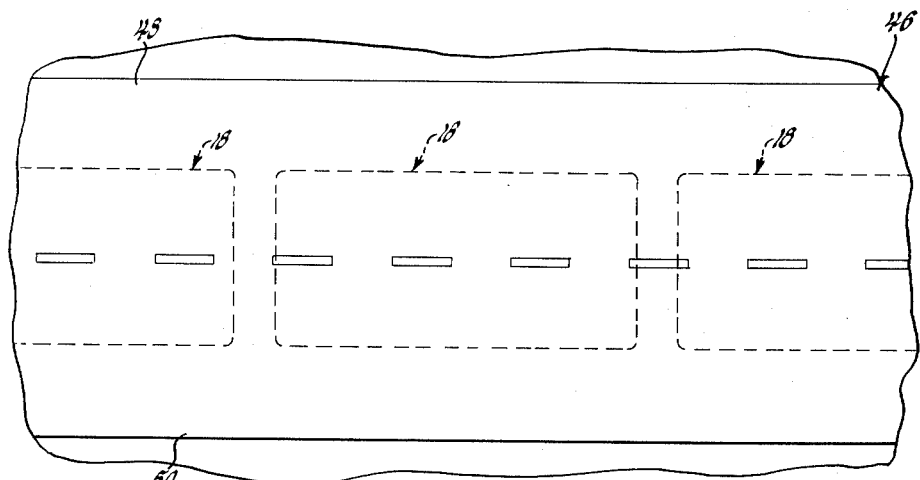
FIGURE 4 is a plan view of a portion of two-lane, bidirectional roadway properly equipped for operation as specified by a further form of the present invention.

Referring now to FIGURE 4, the system is incorporated into a bidirectional roadway 46 having lanes 48 and 50 upon which traffic flows in opposite directions. The desired paths of vehicle travel in the opposite directions are defined by opposite sides of a plurality of closed rectangular loops 18, which are laid end-to-end in a continuous fashion under the surface of the roadway. As previously indicated in FIGURES 1 and 3, the loops 18 are disposed in the roadway, such that the sides of greater length lie substantially in the centers of the lanes 48 and 50.

In operation, the method proposed in FIGURE 4 must necessarily provide a means to inform vehicle operators of the transmitter frequency which is assigned to their particular direction of travel. This may be accomplished in a number of ways. For example, strategically located roadside signs may be employed; or on a tollway, the attendant may inform each vehicle operator; or coded means may be placed in the roadway to which the pickup arrangement 26 may be made responsive to automatically tune the vehicle transmitter 22. In any event, vehicles proceeding in opposite directions will be assigned substantially different frequencies, such that the frequency selective pickups of vehicles proceeding in one direction will not be sensitive to the signals induced in the loop 18 by vehicles in the other lane. An additional benefit is realized in that there will be no direct air coupling between transmitters and receivers of vehicles proceeding in opposite directions. The fact that the frequencies employed in opposite directions may have an odd frequency difference will prevent any phase cancellation from taking place. For example, a vehicle proceeding in one of the lanes 12 may operate on an assigned frequency of 10,000 cycles while the other lane may be assigned 15,000 cycles. Using such frequencies as these, it can be seen that the frequency selective means in the pickups may easily distinguish between the two frequencies. Similarly, very little, if any, harmonic distortion will exist between the two frequencies. It is to be understood that the capacitors 32 and 34 of the pickup arrangement 26 will also require returning for each assigned frequency.

It can be seen from FIGURE 4 that the centrally located loop 18 may be employed to provide a continuous path through an intersection of two bidirectional roadways. It will be necessary to place a loop in the center of the intersection with the shape of the loop conforming to the angle of intersection such that the four vehicle guidance paths are continued by respective sides of the four-sided loop.

It is to be understood that the embodiments shown and described above are merely illustrative and that various changes and modifications to the basic system may be made without departing from the true scope of the invention. For a definition of the invention reference should be had to the appended claims.

What is claimed is:

1. In a system for automatically guiding vehicles having steering means along a bidirectional roadway, the system comprising a closed loop of conductive material disposed in the roadway such that a first portion of the loop defines a desired path of vehicle travel in one direction along the roadway and a second portion of the loop defines a desired path of vehicle travel in the opposite direction along the roadway, a signal transmitter mounted on the rear of each vehicle, the transmitters mounted on the vehicles proceeding in one direction operating at a first predetermined frequency and the transmitters mounted on vehicles proceeding in the opposite direction operating at a second predetermined frequency, the transmitters being coupled to the loop to induce respective signals therein at the first and second predetermined frequencies, whereby the loop radiates an electromagnetic field above the roadway, the electromagnetic field having components at the first and second predetermined frequencies, a pickup mounted on the front of each vehicle and responsive to the electromagnetic field to produce a guidance signal indicative of the deviation of the vehicle from the desired path, frequency selective means connected to the pickup to pass only those signals substantially corresponding to the frequency of the transmitter mounted on that vehicle, servo means connected to the frequency selective means and to the vehicle steering means and responsive to the guidance signal to maintain the vehicle in the desired path.

2. A system as defined by claim 1 wherein the first and second portions of the loop are each of such a length as to accommodate a single vehicle in energy transfer relation at any time.

3. A system for automatically guiding a vehicle having steering means along a roadway, the system comprising a plurality of closed loops of conductive material adjacently disposed along the roadway such that a portion of each loop defines a portion of a desired path of vehicle travel, the adjacent loops being located such that the desired path is substantially continuous from one loop to the next, a signal transmitter mounted on the vehicle adjacent the rear thereof and inductively coupled to the loop immediately in proximity thereto whereby the loop radiates an electromagnetic field above the roadway, a pickup mounted on the vehicle adjacent the front thereof and responsive to the electromagnetic field to produce a guidance signal indicative of the magnitude and direction of the deviation of the vehicle from the desired path, and servo means connected to the pickup and to the vehicle steering means and responsive to the guidance signal to maintain the vehicle in the desired path.

4. A system as defined by claim 3 wherein said portion of each loop defines a portion of the desired path whose length accommodates a single vehicle under normal roadway conditions.

5. Apparatus for guiding a dirigible vehicle along a lane of a roadway including a closed loop of conductive material having one longitudinal portion thereof disposed in the lane and the other longitudinal portion thereof laterally displaced from said lane such that said one portion of the loop defines a desired path of vehicle travel, the longitudinal portions of the loop being of sufficient length to accommodate a vehicle within the length defined thereby, a signal transmitter mounted on the vehicle and coupled in energy transfer relation to the closed loop, whereby the energy transferred to the loop causes the loop to radiate an electromagnetic field above the roadway, and a pickup mounted on the vehicle so as to be normally disposed in the electromagnetic field whereby a guidance signal is induced in the pickup which is related to the disposition of the vehicle with respect to the desired path.

6. Apparatus for automatically guiding a dirigible vehicle along a lane of a roadway, the apparatus including a closed loop of conductive material having one longitudinal portion thereof disposed in the lane and the other longitudinal portion thereof laterally displaced from said lane such that said one portion of the loop defines a desired path of vehicle travel, the longitudinal portions of the loop being of sufficient dimension to accommodate a vehicle within the length defined thereby, a signal transmitter mounted on the vehicle and inductively coupled to the closed loop when the vehicle is in proximity thereto, whereby the loop radiates an electromagnetic field above the roadway, a pickup mounted on the vehicle so as to be normally disposed in the electromagnetic field and responsive thereto to produce a guidance signal related to the deviation of the vehicle from the desired path, and servo means connected to the pickup and to the vehicle steering system and responsive to the guidance signal to maintain the vehicle in the desired path.

7. Apparatus for automatically guiding a dirigible vehicle along a lane of a roadway, the apparatus including a closed loop of conductive material having one longitudinal portion thereof disposed in the lane such that said one longitudinal portion of the loop defines a desired path of vehicle travel, the other longitudinal portion of the loop being laterally displaced with respect to said lane, a signal transmitter mounted on the vehicle and inductively coupled to the closed loop when the vehicle is in proximity thereto, whereby the loop radiates an electromagnetic field above the roadway, a pickup mounted on the vehicle so as to be normally disposed in the electromagnetic field, the pickup comprising a pair of inductive coils normally straddling said one portion of the loop to have respective signals induced therein, the relative magnitudes of the signals being related to the distance of the coils from said one portion of the loop, the respective signals normally being equal when the vehicle is properly disposed in the desired path but unequal when the vehicle deviates from the desired path, servo means electrically connected to the coils to compare the signals induced therein and produce an error signal related to the difference therebetween, the servo means also being mechanically connected with the vehicle steering system and responsive to the error signal to return the vehicle to the desired path.

8. A system for automatically guiding a vehicle having steering means along a lane of a roadway, the system comprising a closed loop of conductive material having one longitudinal portion thereof disposed in the lane such that said one portion of the loop defines a desired path of vehicle travel, the other longitudinal portion of the loop being laterally displaced with respect to said lane, the longitudinal portions of the loop being of sufficient dimension to accommodate a vehicle within the length thereof, a signal transmitter mounted on the vehicle adjacent the rear thereof and transmitting signals at a predetermined frequency, the transmitter being inductively coupled to the closed loop to induce a signal of the predetermined frequency therein, whereby the loop radiates an electromagnetic field above the roadway, a pickup mounted on the vehicle adjacent the front thereof and responsive to the electromagnetic field to produce a guidance signal indicative of the deviation of the vehicle from the desired path, frequency selective means connected to the pickup to pass only those signals corresponding to the predetermined frequency, servo means connected to the frequency selective means and to the vehicle steering means and responsive to the guidance signal to maintain the vehicle in the desired path.

9. Apparatus for guiding a dirigible vehicle along a lane of a roadway including a closed loop of conductive material having one longitudinal portion thereof disposed in the lane such that said one longitudinal portion of the loop defines a desired path of vehicle travel, the other longitudinal portion of the loop being laterally displaced with respect to said lane, a signal transmitter mounted on the vehicle and coupled in energy transfer relation to the closed lop whereby the energy transferred to the loop causes the loop to radiate an electromagnetic field above the roadway, a pickup mounted on the vehicle so as to be normally disposed in the electromagnetic field, whereby a guidance signal is induced in the pickup which is indicative of the deviation of the vehicle from the desired path, means operatively connected with the pickup to render the pickup insensitive to signals directly coupled thereto from the signal transmitter, and servo means connecting the pickup and the vehicle steering means and responsive to the guidance signal to reduce the deviation to zero.

10. A system for automatically guiding a vehicle having steering means along a lane of a roadway, the system comprising a closed loop of conductive material having one longitudinal portion thereof disposed in the lane such that said one longitudinal portion of the loop defines a desired path of vehicle travel, the other longitudinal portion of the loop being laterally dispaced with respect to said lane, a signal transmitter mounted on the vehicle adjacent the rear thereof and transmitting signals at a predetermined frequency, the transmitter being inductively coupled to the closed loop to induce a signal of the predetermined frequency therein, whereby the loop radiates an electromagnetic field above the roadway, a pickup mounted on the vehicle adjacent the front thereof and responsive to the electromagnetic field to produce a guidance signal indicative of the deviation of the vehicle from the desired path, cancellation means operatively connected to the pickup to render the pickup insensitive to signals directly coupled thereto from the signal transmitter, frequency selective means connected to the pickup to pass only those signals corresponding to the predetermined frequency, servo means connected to the frequency selective means and to the vehicle steering means and responsive to the guidance signal to maintain the vehicle on the desired path.

No references cited.

A. HARRY LEVY, *Primary Examiner.*

PHILIP ARNOLD, *Examiner.*

UNITED STATES PATENT OFFICE
CERTIFICATE OF CORRECTION

Patent No. 3,198,279

August 3, 1965

Clark E. Quinn

It is hereby certified that error appears in the above numbered patent requiring correction and that the said Letters Patent should read as corrected below.

Column 3, line 3, for "extending" read -- extends --; column 5, line 59, for "returning" read -- retuning --; line 75, for "In a" read -- A --.

Signed and sealed this 31st day of May 1966.

(SEAL)
Attest:

ERNEST W. SWIDER
Attesting Officer

EDWARD J. BRENNER
Commissioner of Patents